(12) United States Patent
Terane

(10) Patent No.: US 6,501,858 B1
(45) Date of Patent: *Dec. 31, 2002

(54) IMAGE COMPRESSION AND EXPANSION APPARATUS USING A EFFECTIVELY MODIFIABLE QUANTIZATION TABLE

(75) Inventor: Hideyuki Terane, Hyogo (JP)

(73) Assignees: Mitsubishi Denki Kabushiki Kaisha, Tokyo (JP); Mitsubishi Electric Semiconductor Software Co., Ltd., Itami (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 890 days.

(21) Appl. No.: 08/967,787

(22) Filed: Nov. 10, 1997

Related U.S. Application Data (63) Continuation of application No. 08/527,207, filed on Sep. 12, 1995, now abandoned.

(30) Foreign Application Priority Data

May 18, 1995 (JP) ............................................ 7-119957

(51) Int. Cl.[7] .......................... G06K 9/36; G06K 9/38; G06K 9/46
(52) U.S. Cl. ........................................ 382/239; 382/251
(58) Field of Search ................................ 382/239, 246, 382/250, 251, 232, 235, 248; 358/261.2, 430, 433, 427, 432; 341/51, 65, 106; 348/404, 405, 403, 420

(56) References Cited

U.S. PATENT DOCUMENTS

| | | | | |
|---|---|---|---|---|
| 4,546,342 A | * | 10/1985 | Weaver et al. | 341/51 |
| 5,260,808 A | * | 11/1993 | Fujii | 358/433 |
| 5,293,252 A | * | 3/1994 | Kim et al. | 358/427 |
| 5,295,077 A | * | 3/1994 | Fukuoka | 358/433 |
| 5,301,040 A | * | 4/1994 | Hoshi et al. | 358/261.2 |
| 5,396,291 A | * | 3/1995 | Sanpei | 348/405 |
| 5,434,623 A | * | 7/1995 | Coleman et al. | 348/405 |
| 5,481,309 A | * | 1/1996 | Juri et al. | 348/405 |
| 5,517,581 A | * | 5/1996 | Johnston et al. | 382/239 |
| 5,565,992 A | * | 10/1996 | Enari et al. | 358/433 |
| 5,570,203 A | * | 10/1996 | Suzuki et al. | 348/405 |
| 5,883,979 A | * | 3/1999 | Beretta et al. | 382/251 |

FOREIGN PATENT DOCUMENTS

| | | |
|---|---|---|
| JP | 04-247789 | 9/1992 |
| JP | 06-181522 | 6/1994 |

* cited by examiner

*Primary Examiner*—Timothy M. Johnson
(74) *Attorney, Agent, or Firm*—Oblon, Spivak, McClelland, Maier & Neustadt, P.C.

(57) ABSTRACT

An image compression and expansion apparatus is provided which changes an appearance value of quantization table of quantizer/inverse-quantizer without actually changing values of quantization table by carrying out calculation for every processing. An image compression and expansion apparatus which compresses and expands image data comprises a quantizer which linearly quantizes a Discrete Cosine Transform coefficient by different step size for every coefficient location, an inverse-quantizer which inverse-quantizes coefficients obtained in Huffman decoding, and a quantization table which is necessary for quantization and inverse-quantization process comprising: a register for setting a necessary value in response to an outside signal; a data processing unit for carrying out an operation between values set into the register and values in the quantization table to carry out quantization and inverse-quantization operation.

6 Claims, 7 Drawing Sheets

IMAGE COMPRESSION AND EXPANSION APPARATUS USING A EFFECTIVELY MODIFIABLE QUANTIZATION TABLE

This application is a Continuation of application Ser. No. 08/527,207, filed on Sep. 12, 1995, now abandoned.

BACKGROUND OF THE INVENTION

1. Field of the Invention

The invention relates to a quantizer table controller of quantizer/inverse-quantizer in an image compression and expansion apparatus.

2. Description of the Prior Art

Figure 8:
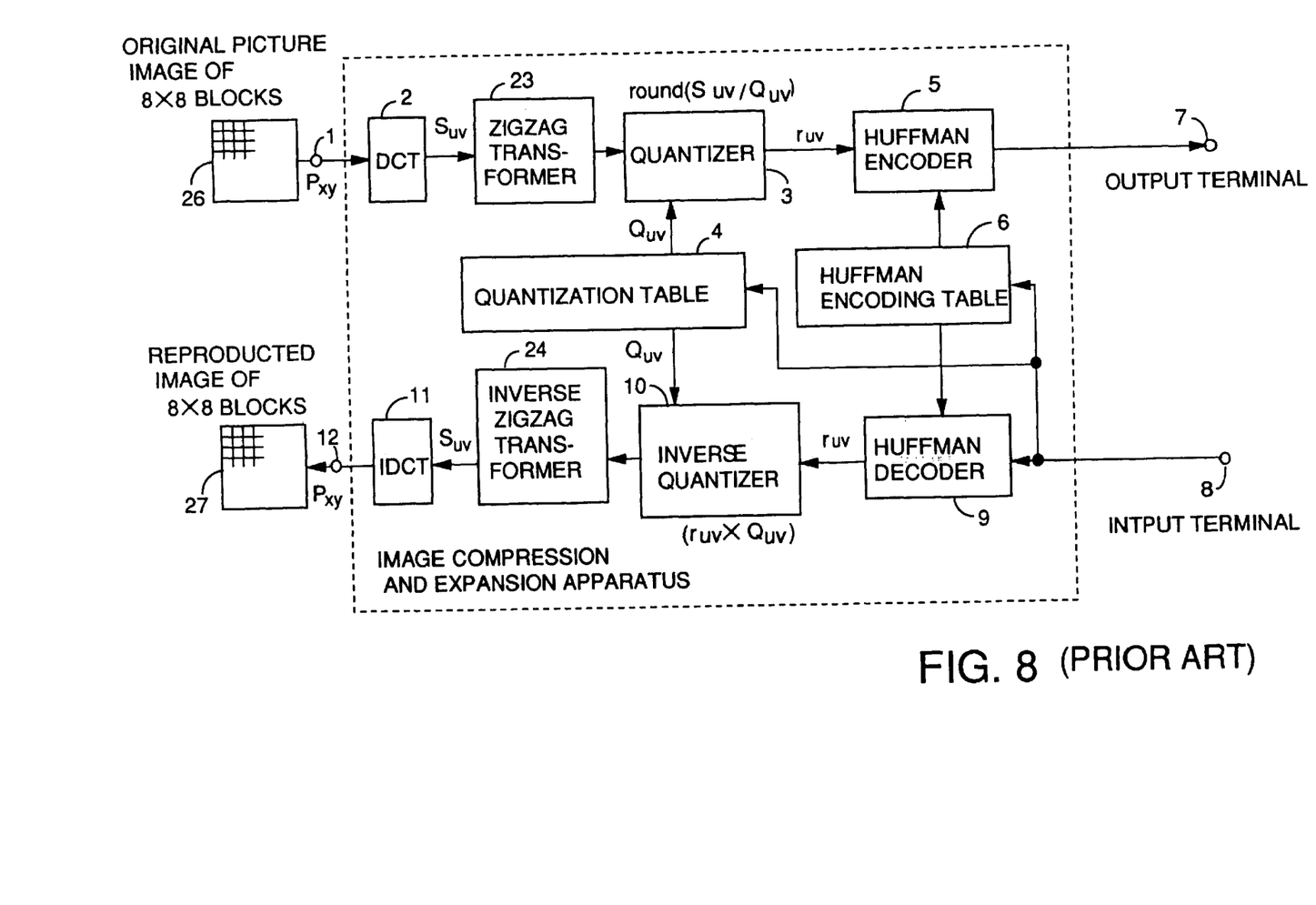
FIG. 8 is a basic block diagram showing a conventional image compression and expansion apparatus.

FIG. 8 is a block diagram showing a conventional image compression and expansion apparatus. An operation of the first embodiment is explained below. First of all, in the coder portion, image data, for example, component image $P_{xy}$ (x, y=0,1,2,3 . . . 7) having an 8-bit width, is inputted from the image data input terminal 1. The inputted image data is transmitted to DCT (Discrete Cosine Transformer) 2. DCT 2 carries out a two dimensional Discrete Cosine Transform on the divided 8×8 picture element block $P_{xy}$. As a result of the two dimensional Discrete Cosine Transform, 64 (=8×8) coefficients $S_{uv}$ are obtained. The 64 coefficients obtained are then rearranged from a serial order to a zigzag order in a zigzag transformer 23 and transmitted to the quantizer 3. The 64 coefficients are quantized in the quantizer 3 by different step sizes at every coefficient location using the quantization table 4. The 64 quantized coefficients are transmitted to Huffman encoder 5. Huffman encoder 5 carries out a coding operation according to Huffman coding system using the encoding table 6 and the encoded data are outputted from the output terminal 7 in units of several bytes (16-bits wide, for instance).

Next, in the decoder portion, the encoded data are inputted into an input terminal 8 in units of several bytes unit. The inputted encoded data are transmitted to Huffman decoder 9. In Huffman decoder 9, the data is then decoded to $r_{uv}$ by Huffman decoding system using the encoding table 6 and then transmitted to the inverse-quantizer 10. Huffman decoded coefficients are inverse-quantized to $S_{uv}$ in the inverse-quantizer 10 per 64 coefficients using the quantization table 4 rearranged from a zigzag order into a serial order for every 8×8 image block at an inverse zigzag transformer 24, and then transmitted to the inverse discrete cosine transformer (IDCT) 11.

The inverse discrete cosine transformer 11 carries out a two dimensional Inverse Discrete Cosine Transform for every 8×8 picture element block. As a result of Inverse Discrete Cosine Transform, reconstruction image data $P_{xy}$ for every 8×8 picture element block are obtained and then the image data $P_{xy}$ are outputted from the image data output terminal 12 as a component image having an 8-bit width.

Detailed operation is explained below. An 8×8 component image $P_{xy}$ (x, y=0, 1, 2, 3 . . . 7) is transformed using a two dimensional Discrete Cosine Transform at DCT 2 and the following coefficient $S_{uv}$ is obtained from formula (1):

$$S_{uv} = \frac{1}{4}C_u C_v \sum_{x=0}^{7}\sum_{y=0}^{7}(P_{xy}-L_s)\cos\frac{(2x+1)u\pi}{16}\cos\frac{(2y+1)v\pi}{16} \quad (1)$$

where x, y=picture element position within block u, v=location of Discrete Cosine Transform coefficient $$Cu, Cv = 1/\sqrt{2} : u, v = 0$$
$$= 1 : \text{others}$$

$$Ls = 128: \text{ bit accuracy of } Pxy = 8 \text{ bits}$$
$$= 2048: \text{ bit accuracy of } Pxy = 12 \text{ bits}$$

Figure 9:
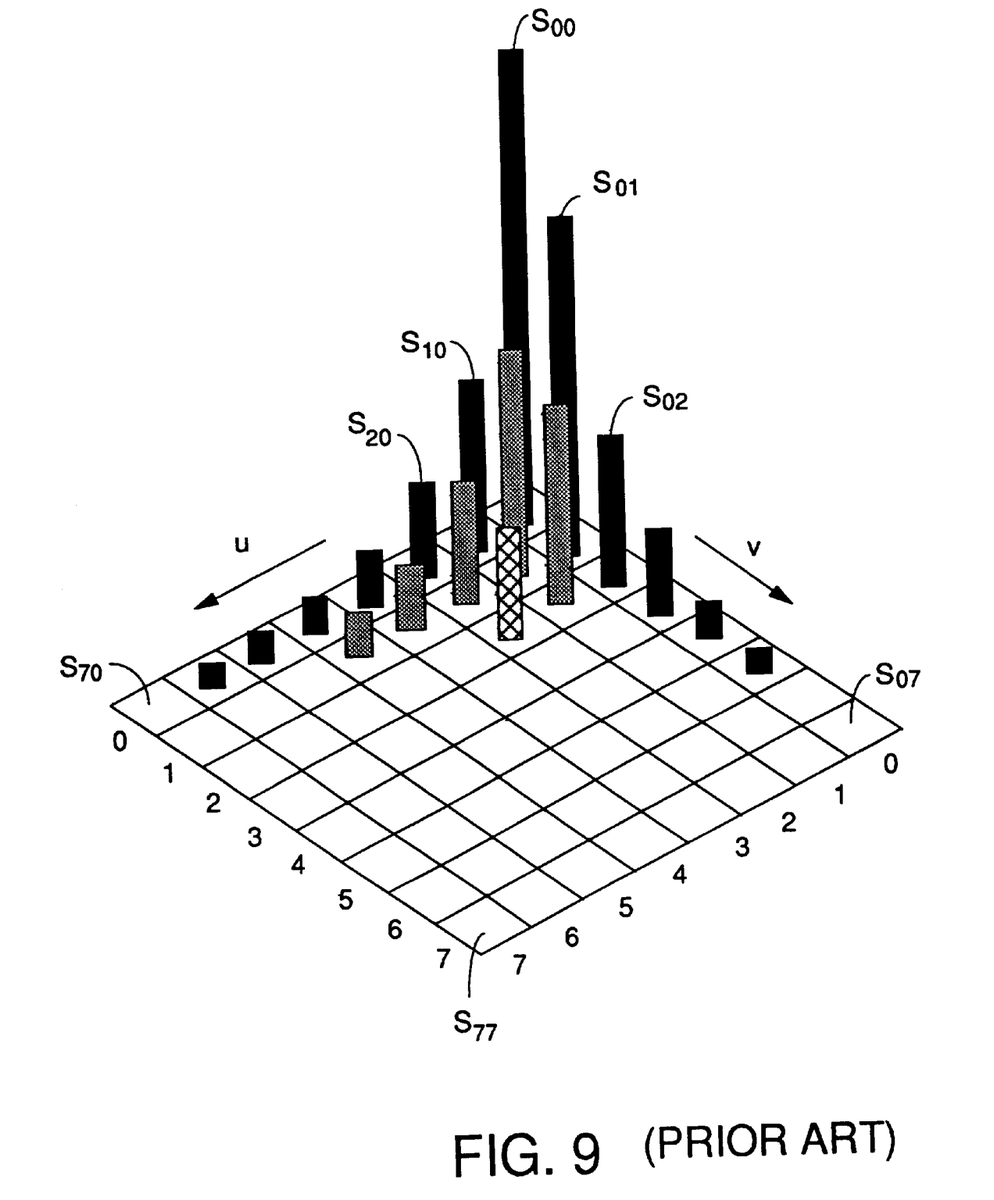
FIG. 9 is a distribution graph of quantized Discrete Cosine Transform coefficients after two dimensional Discrete Cosine Transform and quantization of 8×8 picture element blocks in an image compression and expansion apparatus.

Discrete Cosine Transform coefficient $S_{uv}$ is obtained by the two dimensional Discrete Cosine Transform. Discrete Cosine Transform coefficient $S_{uv}$, as shown in FIG. 9, comprises $S_{00}$ (DC coefficient) and the rest of $S_{01}\sim S_{77}$ (AC coefficient). $S_{00}$ has a maximum value and other values of AC coefficient are very small compared with $S_{00}$.

A more detailed explanation about the quantizer 3 and the inverse-quantizer 10 of the invention is given below. Discrete Cosine Transform coefficients obtained as above are divided using values $Q_{uv}$ of quantization table 4 in the quantizer 3. In other words, a quantized Discrete Cosine Transform coefficient $r_{uv}$ is calculated as follows.

$$r_{uv}=\text{round}(S_{uv}/Q_{uv})$$

Where, the round function is a function which assigns an operation result of $S_{uv}/Q_{uv}$ to a nearest integer number. Therefore, a quantization table value $Q_{uv}$ is determined such that the quantization table value $Q_{uv}$ becomes large where the two dimensional order uv increases. As a result, most of the AC coefficients become zero where the two dimensional order uv is large. Thus, the component image of 8×8 picture elements is transformed by two dimensional Discrete Cosine Transform and quantized in order to compress the component image, which greatly decreases the transmitted bits as a result.

On the other hand, in the decoder portion, a compressed picture signal inputted from the input terminal 8 is decoded in Huffman decoder 9 and transformed to quantized Discrete Cosine Transform coefficients $r_{uv}$. Quantized Discrete Cosine Transform coefficient $r_{uv}$ is multiplied, i.e. inverse-quantized, by value $Q_{uv}$ of quantization table 4 in the inverse-quantization 10.

Discrete Cosine Transform coefficient $S_{uv}$ is obtained by carrying out the inverse-quantization by the following formula:

$$S_{uv}=r_{uv}\times Q_{uv}$$

Discrete Cosine Transform coefficient $S_{uv}$ thus obtained is transformed to a component image $P_{xy}$ of 8×8 picture elements by a two dimensional Inverse Discrete Cosine Transform shown in formula (2):

$$P_{xy} = \frac{1}{4}\sum_{u=0}^{7}\sum_{v=0}^{7}C_u C_v S_{uv}\cos\frac{(2x+1)u\pi}{16}\cos\frac{(2y+1)v\pi}{16} + L_s \quad (2)$$

where x, y=picture element position within block u, v=location of Discrete Cosine Transform coefficient $$Cu, Cv = 1/\sqrt{2} : u, v = 0$$
$$= 1 : \text{others}$$

$$Ls = 128: \text{ bit accuracy of } Pxy = 8 \text{ bits}$$
$$= 2048: \text{ bit accuracy of } Pxy = 12 \text{ bits}$$

Since the quantizer/inverse-quantizer in a conventional image compression and expansion apparatus is constructed as explained above, a table value had to be updated because every different processing or expansion processing needs a different quantization table value. When updating a quantization table, it is difficult to update a quantization table without stopping the system. Therefore, it is necessary to stop the system before updating the quantization table in the conventional art.

SUMMARY OF THE INVENTION

It is an object of the present invention to provide an image compression and expansion apparatus which changes values of a quantization table of quantizer/inverse-quantizer in appearance by carrying out an operation at each processing step without actually writing new quantization table values in a quantization table.

It is a further object of the present invention to provide an image compression and expansion apparatus wherein values of register can be controlled from outside a CPU, which may easily change many kinds of tables.

It is a further object of the present invention to provide an image compression and expansion apparatus wherein the compressibility of image may be easily changed locally in the display by always monitoring the compression data and by changing a scaling factor according to various kinds of conditions such as a block unit and a block line unit.

It is a further object of the present invention to provide an image compression and expansion apparatus wherein the compressibility can be changed such that it is rough at the end of a frame and fine at the center portion of the frame.

According to a further aspect of the present invention, there is provided an image compression and expansion apparatus which comprises a register for setting necessary values in response to an outside signal; a data processing unit for carrying out an operation between values set into the register and values in the quantization table thereby carrying out quantization and inverse-quantization operations.

According to a further aspect of the present invention, there is provided an image compression and expansion apparatus wherein a data processing unit comprises multiplication means which multiplies data output $Q_{uv}$ of the quantization table by an output C of the register to generate a new table value $Q_{uv}'$ using following formula.

$$Q_{uv}'=Q_{uv}\times C$$

According to a further aspect of the present invention, there is provided an image compression and expansion apparatus wherein a data processing unit comprises shift means which shifts a data output $Q_{uv}$ of the quantization table toward an upper bit direction or a lower bit direction in response to output C of the register to generate a new table value $Q_{uv}'$ using the following formula:

$$Q_{uv}'=Q_{uv}\times 2^c$$

According to further aspect of the present invention, there is provided an image compression and expansion apparatus wherein a data processing unit comprises multiplication means which multiplies a data output $Q_{uv}$ of the quantization table by an output C of the register, and a shift means which shifts data output $Q_{uv}$ of the quantization table toward an upper bit direction or a lower bit direction in response to the output C of the register to generate a new table value $Q_{uv}'$ using the following formula:

$$Q_{uv}'=Q_{uv}\times C\times 2^n$$

According to a further aspect of the present invention, there is provided an image compression and expansion apparatus wherein a data processing unit comprises division means which divides a data output $Q_{uv}$ of the quantization table by an output C of the register to generate the new table value $Q_{uv}'$ using a following formula:

$$Q_{uv}'=Q_{uv}/C$$

According to a further aspect of the present invention, there is provided an image compression and expansion apparatus wherein a data processing unit comprises shift means which shifts a data output $Q_{uv}$ of the quantization table toward an upper bit direction or a lower bit direction according to the output C of the register, and division means which divides a data output $Q_{uv}$ of the quantization table by the output C of the register to generate a new table value $Q_{uv}'$ using following formula:

$$Q_{uv}'=Q_{uv}\times 2^n/C$$

According to further aspect of the present invention, there is provided an image compression and expansion apparatus wherein an output C of the data processing unit is a constant.

According to further aspect of the present invention, there is provided an image compression and expansion apparatus wherein the output C of the data processing unit is a function of picture element location (u,v), that is, C=f (u,v).

According to further aspect of the present invention, there is provided an image compression and expansion apparatus wherein the output C of the data processing unit is a function of location in a frame.

DETAILED DESCRIPTION OF THE PREFERRED EMBODIMENTS

Embodiment 1

Figure 1:
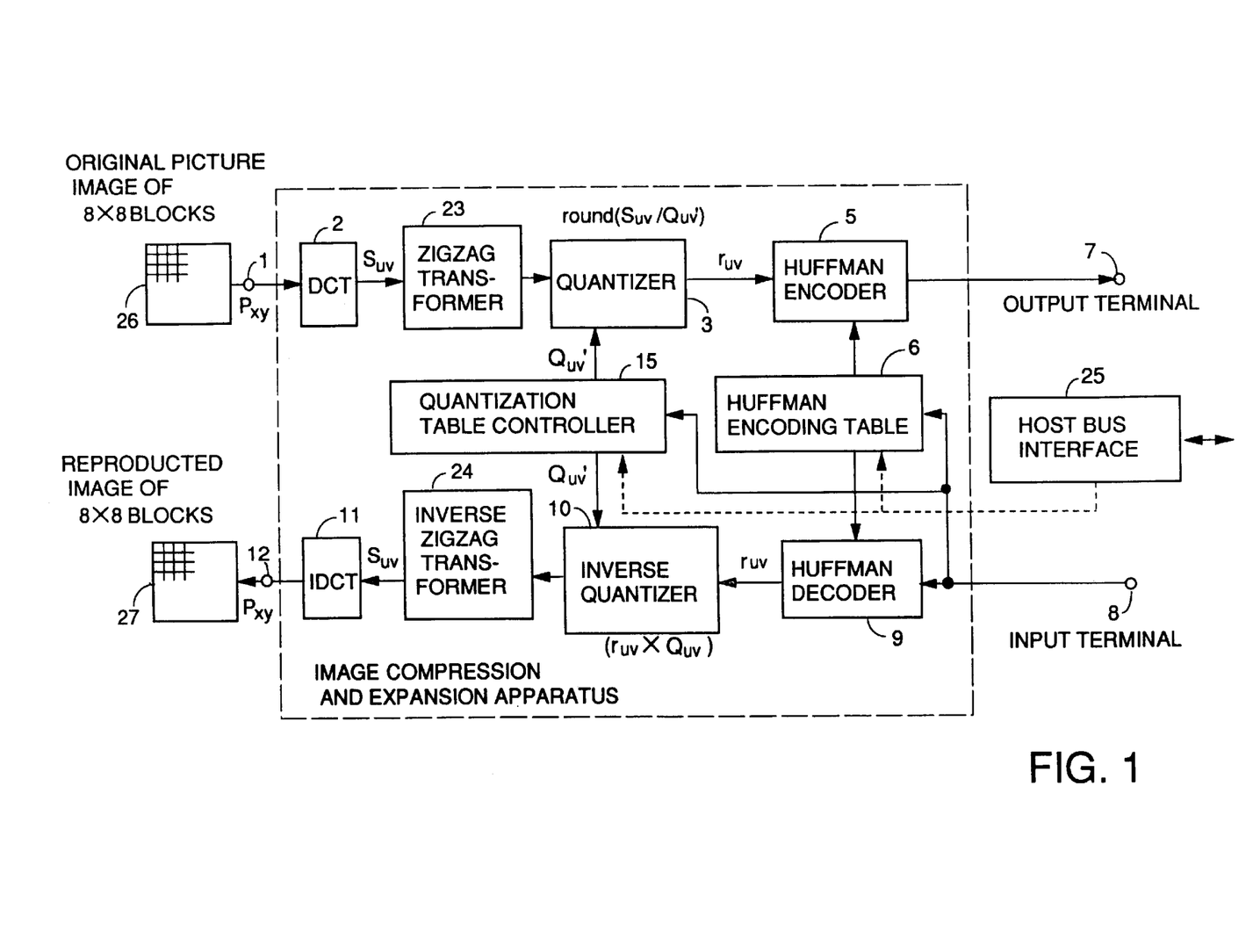
FIG. 1 is a block diagram showing an overall construction of an image compression and expansion apparatus of the present invention.
Figure 2:
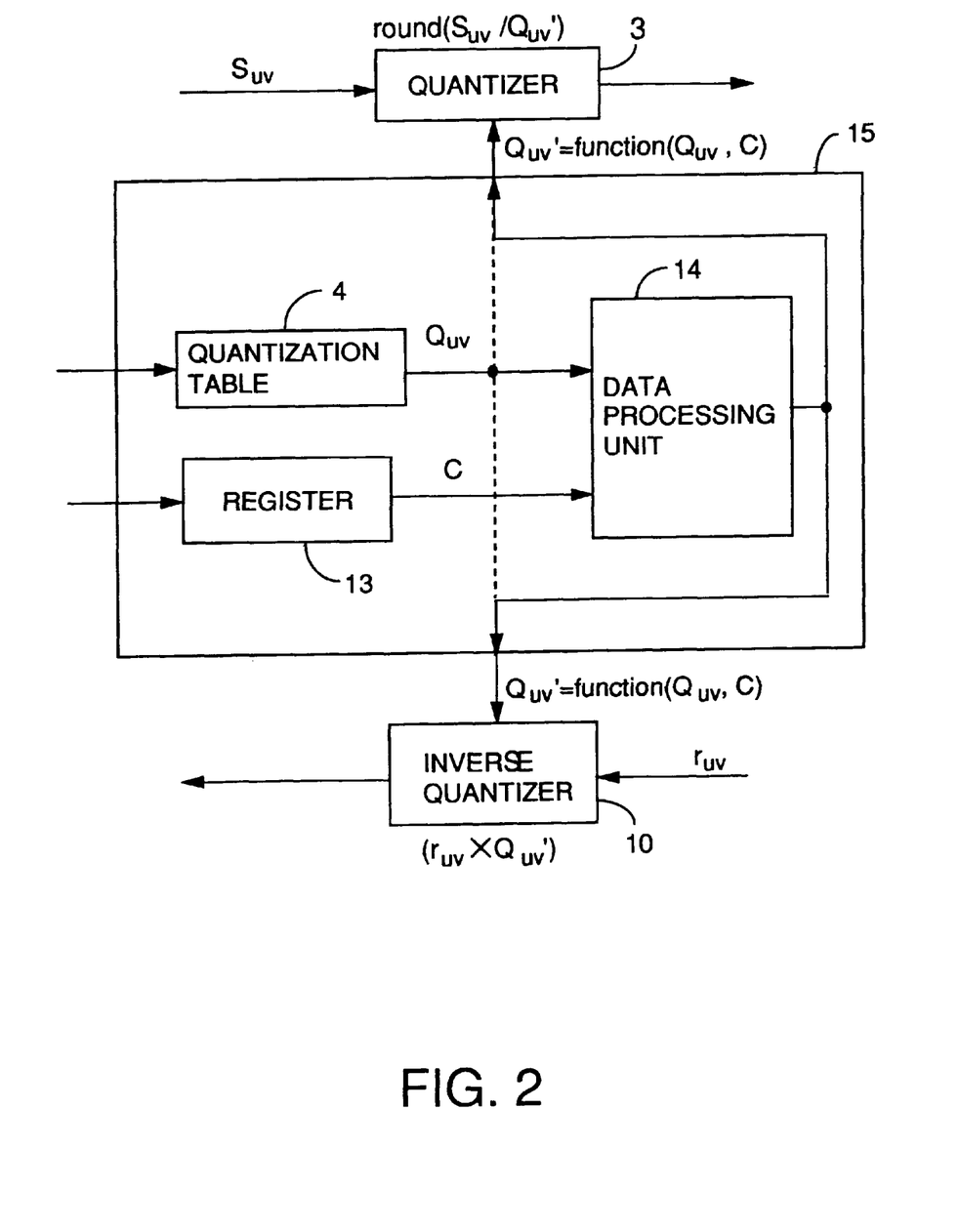
FIG. 2 is a block diagram showing a construction of a quantization table controller of quantizer/inverse-quantizer in a first embodiment of the present invention.

FIG. 1 shows an overall construction of image compression and expansion apparatus of the present invention. FIG. 2 shows the structure of a circuit for controlling an effective change in quantization table values of a quantizer/inverse-quantizer in a first embodiment of the present invention. In FIG. 1, a register 13 and a quantization table 4 in the quantization table controller 15 are controlled from an outside CPU via a host bus interface 25.

An operation of the image compression and expansion apparatus of the present invention is explained using FIG. 1 and FIG. 2. First, when quantization processing at the encoder portion, DCT 2 carries out a two dimensional Discrete Cosine Transform for every 8×8 component picture elements and the resultant 64 Discrete Cosine Transform coefficients $S_{uv}$ are inputted to quantizer 3. The Discrete Cosine Transform coefficients $S_{uv}$ are transformed into a zigzag order, then divided by values $Q_{uv}$, which are stored in the quantization table 4, at the quantizer 3. As described above, the quantized Discrete Cosine Transform coefficient $r_{uv}$ is usually obtained by the following formula:

$$r_{uv} = \text{round}(S_{uv}/Q_{uv})$$

On the other hand, when quantization is carried out by a quantization table having another value $Q_{uv}'$, quantization table $Q_{uv}$ and value C which is set in the register 13 from outside are calculated in the data processing unit 14 for every coefficient according to the following formula to generate a new table value $Q_{uv}'$ without rewriting a quantization table to $Q_{uv}$.

$$Q_{uv}' = \text{function}(Q_{uv}, C)$$

Where, the above "function" indicates various operations which can be applied, such as multiplication, division, and shift.

Quantization is carried out in the quantizer 3 by using the quantization table $Q_{uv}'$ according to the following formula:

$$r_{uv} = \text{round}(S_{uv}/Q_{uv}')$$

Quantized 64 coefficients are transmitted to Huffman encoder 5 to be encoded and transmitted to the transmission line.

Next, when performing inverse-quantization processing in the decoder portion, the coefficient $r_{uv}$ is decoded by Huffman decoding system in Huffman decoder 9. The quantization table $Q_{uv}$ and the value C which is set in the register 13 from outside are processed in the data processing unit 14 for every coefficient according to the following formula for every coefficient to generate a new table value $Q_{uv}'$ without rewriting a quantization table to $Q_{uv}$ as was done during the coding processing. An operation is carried out according to the following formula as was done during the coding processing.

$$Q_{uv}' = \text{function}(Q_{uv}, C)$$

By using a new quantization table value $Q_{uv}'$ obtained as above, inverse-quantization, that is, the operation of inverse-quantization is carried out in the inverse-quantizer 10, and thus Discrete Cosine Transform coefficient $S_{uv}$ is obtained. In this case, inverse-quantization is carried out by the following multiplication.

$$S_{uv} = r_{uv} \times Q_{uv}$$

The Discrete Cosine Transform coefficient $S_{uv}$ is transformed to $P_{xy}$ by a two dimensional Inverse Discrete Cosine Transform (IDCI) shown in the above formula (2) and then an image close to an original image is reproduced.

In the present invention, a register 13 and the quantization table 4 can be read and written directly from the outside CPU through a host bus interface 25, as shown in FIG. 1. Usually, each register has its corresponding assigned address and respective register can be accessible by addressing the register address through host bus interface 25. Therefore, when changing an appearance value of quantization table, the outside CPU addresses the register address and transmits data to be written, for instance, the above value "C", to the register 13, and then the value "C" is written in the register 13.

Also, the changed scaling factor can be handled as a compressed data by adding it to a compressed data using a marker code regulated in JPEG, for example, inserting a scaling factor of one byte behind a marker of 2 bytes.

Embodiment 2

Figure 3:
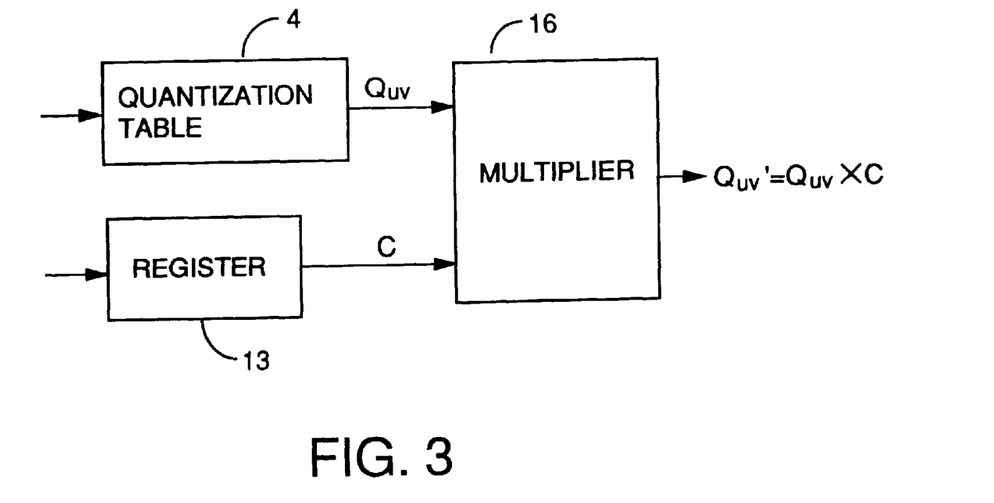
FIG. 3 is a block diagram showing a construction of the quantization table controller of quantizer/inverse-quantizer in a second embodiment of the present invention.

FIG. 3 is a block diagram showing a construction of quantization table controller of quantizer/inverse-quantizer in a second embodiment of the invention. While a block diagram comprising a quantizer 3 and an inverse-quantizer 10 is shown in the previous embodiment, a quantization table controller 15 is solely explained below.

An operation of FIG. 3 is now explained below. A multiplier 16 multiplies 64 values of $Q_{uv}$ in the quantization table 4 by value C which is set into the register 13 from outside for every coefficient to generate a new table value of $Q_{uv}'$. That is, a new table value $Q_{uv}'$ is generated from the following formula:

$$Q_{uv}' = Q_{uv} \times C$$

Where, although usually C is a constant, C may be used such as C=f(u,v) which is a function of a location (u,v). Also, C may be a function of a location in the display. It is possible to locally change a compressibility of the display by turning C into a function of the location in the display. On the other hand, it is apparent from the above description that the same $Q_{uv}'$ may also be used in an inverse-quantizer. This explanation is applied to all subsequent C as well.

Embodiment 3

Figure 4:
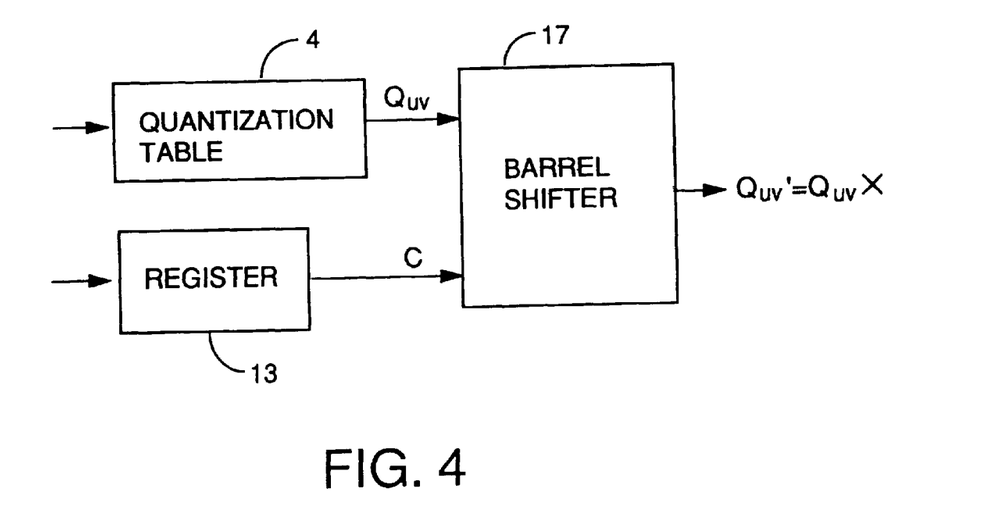
FIG. 4 is a block diagram showing a construction of the quantization table controller of quantizer/inverse-quantizer in a third embodiment of the present invention.

FIG. 4 is a block diagram showing a construction of a quantization table controller of quantizer/ inverse-quantizer in a third embodiment of the invention. While a multiplier 16 multiplies a quantization table by a constant C in the embodiment 2, it is a barrel shifter 17 which carries out the operation in the present embodiment 3. In FIG. 4, the values of the register 13 are set from outside CPU. The barrel shifter 17 carries out shift operational processing between the register 13 and the quantization table 4.

An operation of FIG. 4 is now explained below. The barrel shifter 17 multiplies 64 values of $Q_{uv}$ in the quantization table 4 by $2^c$ where the value C is set into the register 13 from outside for every coefficient to generate a new table value of $Q_{uv}'$. That is, a new table value $Q_{uv}'$ is generated from the following formula:

$$Q_{uv}' = Q_{uv} \times 2^C$$

Embodiment 4

Figure 5:
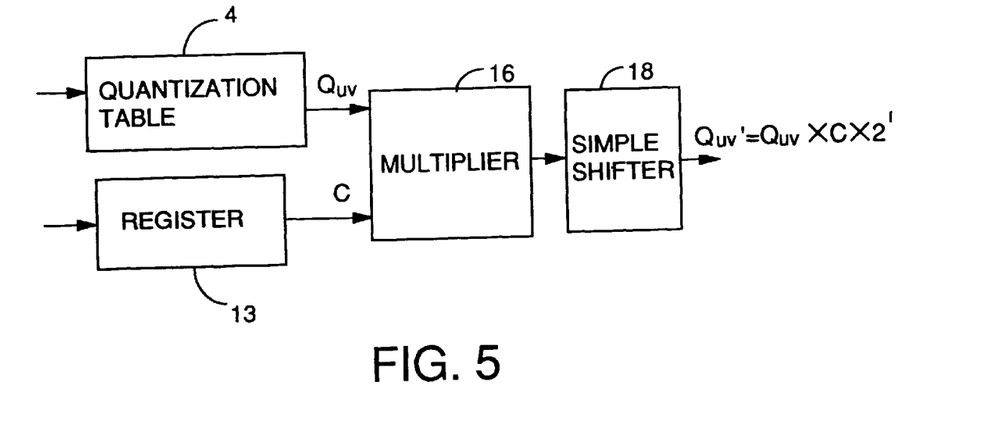
FIG. 5 is a block diagram showing a construction of the quantization table controller of quantizer/inverse-quantizer in a fourth embodiment of the present invention.

FIG. 5 is a block diagram showing a construction of a quantization table controller of a quantizer/inverse-quantizer in a fourth embodiment of the present invention. While a barrel shifter 17 carries out a shift operation between the register 13 and the quantization table 4 in the embodiment 3, it is a multiplier 16+and a simple shifter 18 which carry out the operation in the present embodiment 4. In FIG. 5, the values of the register 13 are set from outside CPU. The multiplier 16 carries out multiplication between the register 13 and the quantization table 4. The simple shifter 18 carries out an arithmetic shift operation by a predetermined value for the multiplied result. Arithmetic shift operation here means a shift operation that retains the sign of the result.

An operation of FIG. 5 is now explained below. The multiplier 16 multiplies 64 values of $Q_{uv}$ in the quantization table 4 by value C which is set into the register 13 from an outside CPU through the host bus interface 25 for every coefficient, and then the multiplied value is further multiplied by $2^n$ times in the simple shifter 18 to generate a new table value of $Q_{uv}'$. That is, a new table value $Q_{uv}'$ is generated from the following formula:

$$Q_{uv}'=Q_{uv} \times C \times 2^n$$

Where, n is set to a predetermined value such as −4 and −6.

Embodiment 5

Figure 6:
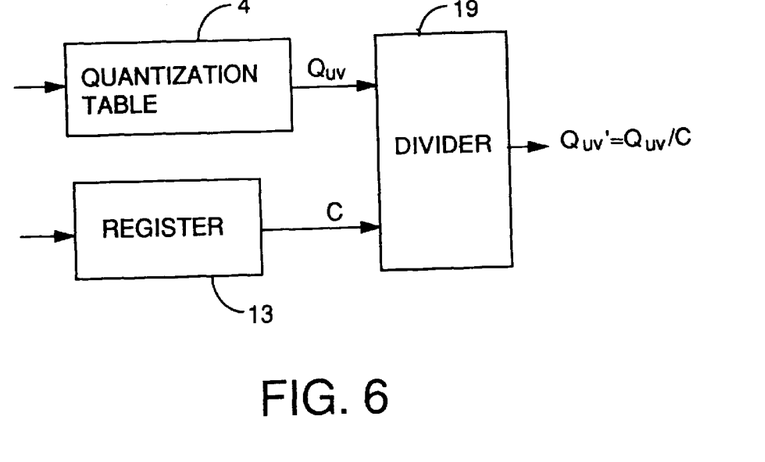
FIG. 6 is a block diagram showing a construction of the quantization table controller of quantizer/inverse-quantizer in a fifth embodiment of the present invention.

FIG. 6 is a block diagram showing a construction of quantization table controller of quantizer/inverse-quantizer in a fifth embodiment of the present invention. While multiplier 16+simple shifter 18 carry out calculation between the quantization table and a constant in the embodiment 4, it is a divider 19 which carries out the operation in the present embodiment 5. In FIG. 6, the values of register 13 are set from outside CPU. The divider 19 carries out division between a register 13 and a quantization table 4.

An operation of FIG. 6 is now explained below. The divider 19 divides 64 values of $Q_{uv}$ in the quantization table 4 by value C which is set into the register 13 from outside CPU through the host bus interface 25 for every coefficient to generate a new table value of $Q_{uv}'$. That is, a new table value $Q_{uv}'$ is generated from the following formula:

$$Q_{uv}'=Q_{uv}/C$$

Embodiment 6

Figure 7:
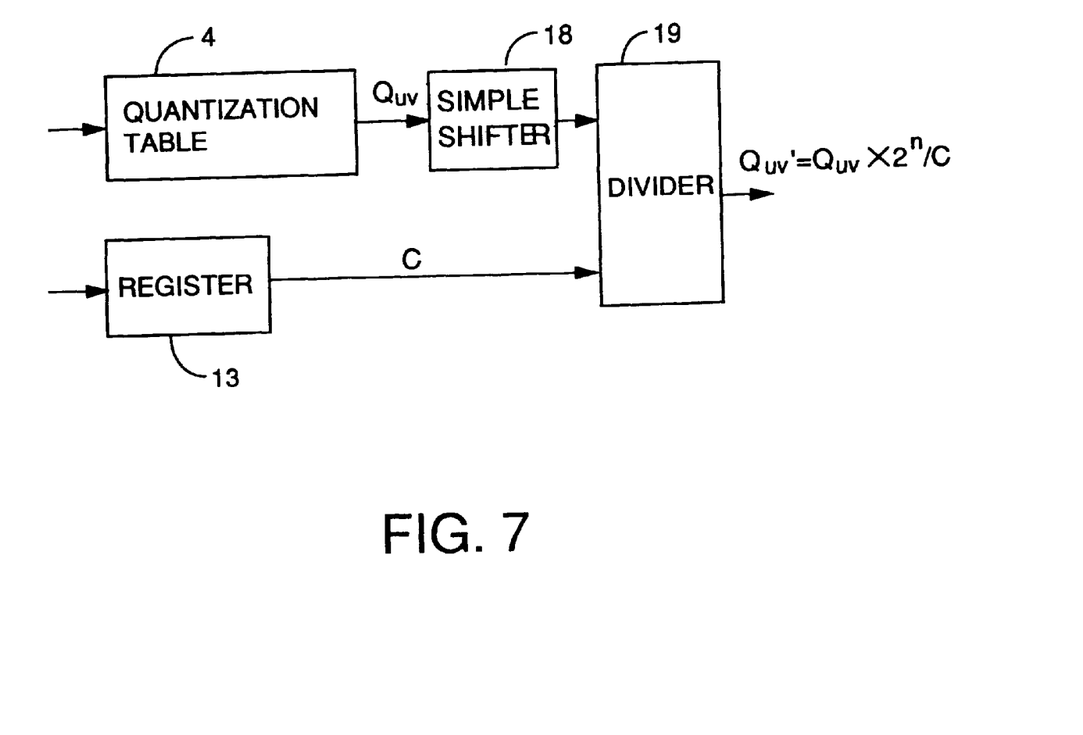
FIG. 7 is a block diagram showing a construction of the quantization table controller of quantizer/inverse-quantizer in a sixth embodiment of the present invention.

FIG. 7 is a block diagram showing a construction of quantization table controller of quantizer/inverse-quantizer in a sixth embodiment of the present invention. While a divider 19 divides 64 values of $Q_{uv}$ in the quantization table 4 by value C in the embodiment 5, it is a simple shifter 18+a divider 19 which carries out the operation in the present embodiment 6. In FIG. 7, the values of the register 13 are set from outside CPU. The simple shifter 18 carries out arithmetic shift operation by predetermined value n for multiplying $Q_{uv}$ by n. The divider 19 carries out division operation between the register 13 and the quantization table 4.

An operation of FIG. 7 is now explained below. The simple shifter 18 multiplies 64 values of $Q_{uv}$ in the quantization table 4 by $2^n$, and then the result is divided by value C, which is set into the register 13 from outside CPU through the host bus interface 25 for every coefficient to generate a new table value of $Q_{uv}'$. That is, a new table value $Q_{uv}'$ is generated from the following formula:

$$Q_{uv}'=Q_{uv} \times C \times 2^n$$

Where, n is set to a predetermined value such as −4 and −6.

What is claimed is:

1. An image compression and expansion apparatus which compresses and expands image data, the apparatus including:
   a quantizer which linearly quantizes a Discrete Cosine Transform coefficient by a different step size for every coefficient location,
   an inverse-quantizer which inverse-quantizes a coefficient obtained in Huffman decoding,
   a host bus interface connected to an exterior apparatus for receiving a control signal from the exterior apparatus; and
   a quantization table controller connected to the host bus interface and receiving the control signal, said quantization table controller comprising:
   a quantization table for storing quantization coefficients used as part of a quantization and inverse-quantization process, each of said quantization coefficients having a position in said quantization table given by (u,v);
   a register for receiving, from the host bus interface, the control signal and for outputting an output C which is a non-constant function with respect to the position of a corresponding coefficient of said quantization coefficients, said non-constant output C given by C=f(u,v), wherein C is independently controllable for each position (u,v) and a value of the output C varies with respect to position; and
   a data processing unit for performing a mathematical function on the non-constant output C from said register and the values in said quantization table, a result of the mathematical function being output from said quantization table controller and used to carry out the quantization and inverse-quantization process.

2. The image compression and expansion apparatus of claim 1, wherein said data processing unit comprises multiplication means which multiply data output $Q_{uv}$ of said quantization table and the non-constant output C of said register to generate a new table value $Q_{uv}'$ using a formula:

$$Q_{uv}'=Q_{uv} \times C.$$

3. The image compression and expansion apparatus of claim 1, wherein said data processing unit comprises shift means which shift data output $Q_{uv}$ of said quantization table toward an upper bit direction or a lower bit direction in response to the non-constant output C of said register to generate a new table value $Q_{uv}'$ using a formula:

$$Q_{uv}'=Q_{uv} \times 2^c.$$

4. The image compression and expansion apparatus of claim 1, wherein said data processing unit comprises:
   multiplication means which multiply data output $Q_{uv}$ of said quantization table and the non-constant output C of said register; and
   shift means which shift data output $Q_{uv}$ of said quantization table toward an upper bit direction or a lower bit direction to generate a new table value $Q_{uv}'$ using a formula:

$$Q_{uv}'=Q_{uv} \times C \times 2^n.$$

5. The image compression and expansion apparatus of claim 1, wherein said data processing unit comprises division means which divide data output $Q_{uv}$ of said quantization table by the non-constant output C of said register to generate a new table value $Q_{uv}'$ using a formula:

$$Q_{uv}'=Q_{uv}/C.$$

6. The image compression and expansion apparatus of claim 1, wherein said data processing unit comprises:
   shift means which shift data output $Q_{uv}$ of said quantization table toward an upper bit direction or a lower bit direction; and
   division means which divide data output $Q_{uv}$ of said quantization table by the non-constant output C of said register to generate a new table value $Q_{uv}'$ using a formula:

$$Q_{uv}'=Q_{uv} \times 2^n/C.$$

* * * * *